(12) United States Patent
Harding (10) Patent No.: US 6,178,892 B1
(45) Date of Patent: Jan. 30, 2001

(54) MAGNETIC/AIR TRANSPORTATION SYSTEM

(76) Inventor: Lou O. Harding, 11303 Winnetka Ave., Chatsworth, CA (US) 91311

(*) Notice: Under 35 U.S.C. 154(b), the term of this patent shall be extended for 0 days.

(21) Appl. No.: 09/409,165

(22) Filed: Sep. 30, 1999

(51) Int. Cl.[7] ..................................................... B61B 13/00
(52) U.S. Cl. .................. 104/155; 104/138.1; 104/139; 104/282; 104/156; 104/124; 104/119
(58) Field of Search .................. 104/23.1, 23.2, 104/138.1, 139, 282, 283, 155, 156, 161, 124, 119, 118, 245, 246, 247, 55, 56

(56) References Cited

U.S. PATENT DOCUMENTS

| | | | |
|---|---|---|---|
| 436,946 | * | 9/1890 | Kelly ..................................... 104/156 |
| 3,543,685 | * | 12/1970 | Rosciszewski ...................... 104/23.1 |
| 3,722,424 | * | 3/1973 | Van Veldhuizen ................... 104/161 |
| 4,108,077 | * | 8/1978 | Laing ..................................... 104/156 |
| 4,658,732 | * | 4/1987 | Coester ................................. 104/156 |
| 4,805,761 | * | 2/1989 | Totsch ................................... 104/156 |
| 5,845,582 | * | 12/1998 | Coester et al. ........................ 104/156 |

* cited by examiner

*Primary Examiner*—Mark T. Le
(74) *Attorney, Agent, or Firm*—Cislo & Thoms, LLP (57) ABSTRACT

A transportation system uses a carrier conduit in the form of a long tube or channel in order to drive a vehicle by air pressure. A carrier having end plates obstructs the travel of air through the carrier conduit. Pressure differentials formed within the carrier conduit serve to propel the carrier through the carrier conduit. By rollably supporting the carrier within the carrier conduit, friction is reduced between the carrier conduit and the carrier. The carrier may be magnetically coupled to a vehicle having vanes and a set of track- or rail-engaging wheel assemblies on vanes. The vanes may pivot upon the vehicle and serve to allow the vehicle to rollably or slidably couple to the carrier conduit track. The motion of the carrier serves to propel the vehicle along the carrier conduit track as the vehicle is magnetically coupled to the carrier. Composite materials used to construct the carrier conduit may allow for such magnetic coupling without the interference that might occur through the use of ferromagnetic materials or the like. The carrier conduit may be mounted upon pillars or pylons and sources of pressure may either be present at either end of the carrier conduit, distributed at propitious points there along, or incorporated into the carrier.

21 Claims, 8 Drawing Sheets

MAGNETIC/AIR TRANSPORTATION SYSTEM

BACKGROUND OF THE INVENTION

1. Field of the Invention

This invention relates to transport systems, and more particularly mass transit transportation system or cargo transportation systems that use air pressure to propel the person or cargo carrier.

2. Description of the Related Art

The ability to move people or things from one place to another is both a necessity and a convenience in today's society. Transportation is a necessity for the easy delivery and distribution of goods and services. It is a convenience as discretionary travel or transport provides an enhanced quality of life.

Ground transportation can be particularly pleasurable as it allows the individuals so traveling to enjoy the surrounding scenery. It is generally less expensive to transport goods by ground services than by air or sea.

With respect to ground transportation, railroads, light rail, monorails, and subways are generally those best known for allowing travel in urban and other areas. Tractor trailer rigs, 18-wheel trucks, and cargo vans provide motorized means by which goods can be transported. Buses provide means by which relatively large numbers of people can be transported by a single vehicle on roadways.

Despite the advantages of the foregoing transportation means currently known in the art, they are also subject to several drawbacks. For example, in the running of locomotive trains and tractor trailer truck rigs, chemical and/or fossil fuel pollution occurs through the exhaust of the burning of fuel in order to operate internal combustion engines. Additionally, such internal combustion engines often generate significant amount of loud noise, disturbing the peace of the surrounding area. This is true even with the use of associated mufflers or the like, which decrease the energy efficiency of such internal combustion engines. Such drawbacks serve to disturb the wildlife habitat in the surrounding area as can be seen by inspecting the areas surrounding locomotive train tracks and/or highway systems.

Generally, the infrastructure to support locomotives and/or truck rigs is significantly expensive, not only to initially construct, but also to maintain in an ongoing basis.

It would be much better to have a simple system having a small number, such as three (3), major assemblies from which the transport system can be constructed. Such a system would preferably be lightweight and constructed from composite materials that would not deplete natural resources (such as wood). The simplicity of such a system would advantageously require minimal maintenance and repair, making the operating cost of the system preferably very low. Such a transport system should be able to maneuver and operate in a closed or open loop system, and negotiate tight curves with a radius of less than fifty (50) feet. Additionally, such a system should preferably be able to negotiate ten percent (10%) grades or better.

As indicated above, certain drawbacks are present in the art that might be addressed more advantageously. A previously issued U.S. Pat. to Mandros (U.S. Pat. No. 4,347,791 issued to Mandros on Sep. 7, 1982 for a Vehicle Guideway System), discloses an air-pressure driven system that incorporates an enclosed rail system by which cargo, including vehicles, may be transported. A complicated switching system is present in the Mandros patent, indicating that the construction of such a system would require significant maintenance as well as a significant, if not costly, construction.

It would be more advantageous to provide a lower-cost system that operates in conjunction with presendy-available technology in order to supply the most advantages and fewer disadvantages amongst the variety in various systems set forth above.

SUMMARY OF THE INVENTION

Three (3) major assemblies aid in forming the present invention. A pressurization passageway, carrier conduit, or pressurization vessel provides a relatively airtight channel through which a propulsion carrier assembly travels. A is passenger vehicle or other car or container is superpositioned and slidably coupled to the carrier conduit and is magnetically or electromagnetically coupled to the propulsion carrier assembly, or carrier.

Air propulsion or pressure is used within the carrier conduit to propel and control the motion of the carrier. The electromagnetic coupling between the carrier and the car serves to propel the car in association with the carrier. Air pressure controls in the form of fans or the like are used at either end of the carrier conduit to control carrier travel. The carrier has two (2) plates serving to obstruct the air flow and cause the carrier to move when air pressure is controllably shifted within the confines of the carrier conduit. Sets of wheels allow the carrier to roll within the carrier conduit and keep it from colliding or scraping the inside of the carrier conduit. Magnets, either permanent or electromagnetic, are present adjacent the top of the carrier conduit. As the carrier conduit is made of composite materials or the like, the field generated by the magnet passes through and up to the car or vehicle. The vehicle has a set of matching magnets that may be polar opposites of, or of like polarity to, those on the carrier.

The vehicle is slidably coupled to the carrier conduit by means of frames or vanes that slide along the exterior of the conduit carrier. Tracks or other constructions can be used to hold the vanes and the vehicle in place upon the carrier conduit. By allowing pivotable coupling between the vanes and the vehicle, curves may be taken by the vehicle in its slidably attached form by the carrier conduit.

OBJECTS OF THE INVENTION

It is an object of the present invention to provide a transportation system.

It is another object of the present invention to provide a transportation system that is both quiet and ecologically friendly.

It is another object of the present invention to provide a transportation system that relies upon air pressure for its motion.

It is yet another object of the present invention to provide a transportation system that is quiet and which does not locally emit any fumes or exhaust in conjunction with the traveling vehicle.

These and other objects and advantages of the present invention will be apparent from a review of the following specification and accompanying drawings.

DESCRIPTION OF THE PREFERRED EMBODIMENT(S)

The detailed description set forth below in connection with the appended drawings is intended as a description of presently preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Figure 1:
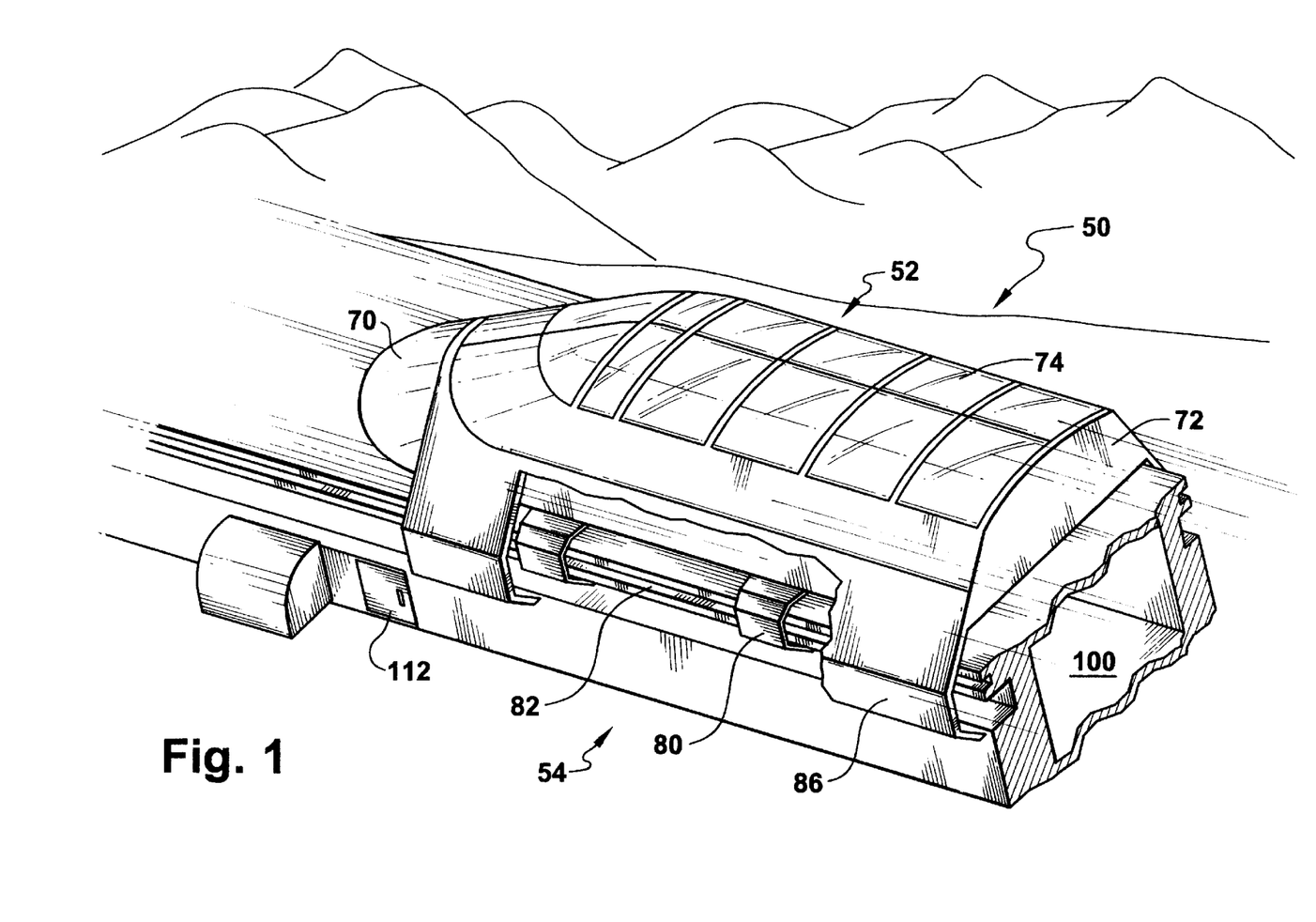
FIG. 1 is a top, rear, side and partial cutaway view of the vehicle, carrier conduit, and frame/wheel mount/vane associated with the vehicle of the present invention.
Figures 6, 7:
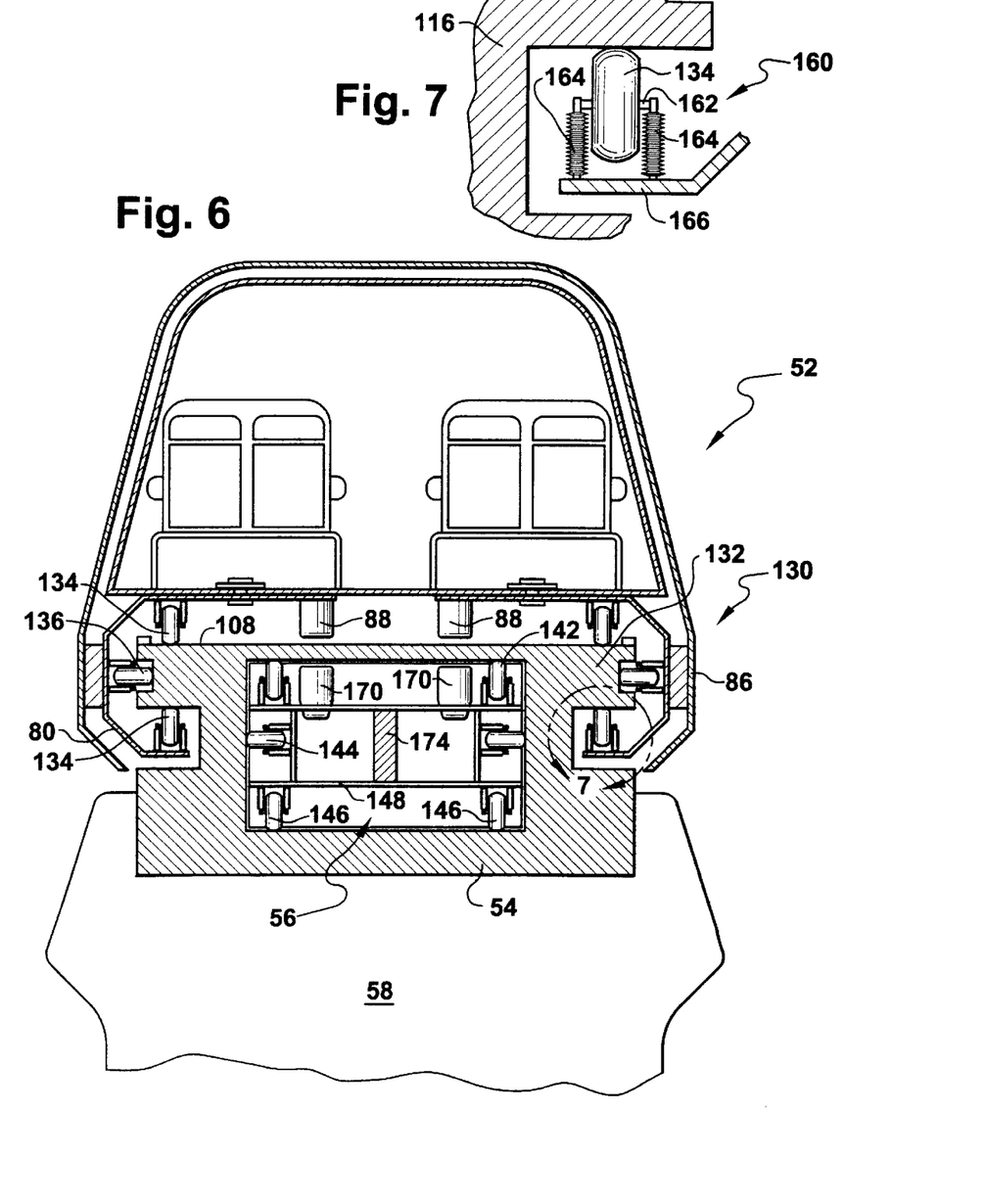
FIG. 6 is a cross-sectional view of the carrier, the carrier conduit, and the vehicle with its wheel/vanes of the present invention as shown in FIG. 2, taken along line 6—6.
FIG. 7 is a close-up and partial cross-sectional view of the wheel and spring/shock assembly as shown in circle 7 of FIG. 6.
Figure 8:
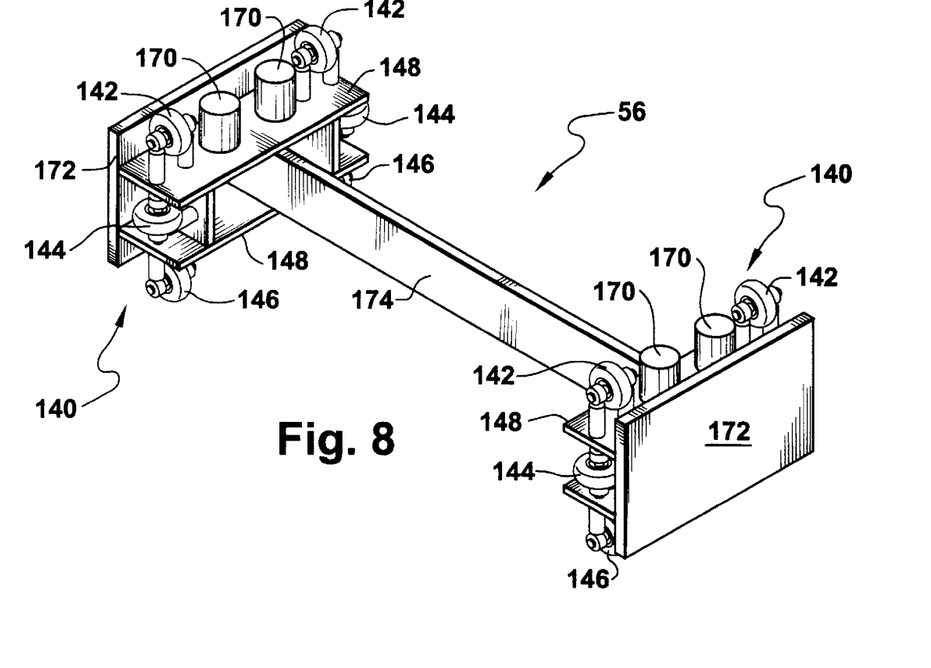
FIG. 8 is a top right perspective view of the propulsion carrier assembly, or carrier, of the present invention.
Figure 9:
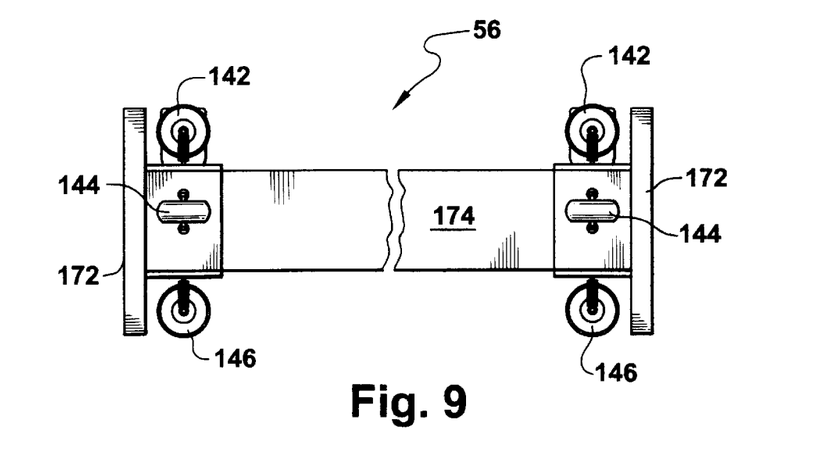
FIG. 9 is a side plan view of the carrier shown in FIG. 8.

As shown in FIG. 1, two (2) primary components of the transportation system 50 of the present invention are the transported vehicle or car 52 and the pressurization passageway, pressurization vessel, carrier conduit, or carrier channel ("carrier conduit") 54. As shown in FIGS. 6, 8, and 9, the third component of the transportation system 50 of the present invention is the propulsion carrier assembly, or carrier 56.

The carrier conduit 54 may be pressurized with a fluid such as air. In order to contain the air, the carrier conduit 54 is generally airtight. The carrier 56 has elements that basically fill the cross-section present in the carrier conduit 54. Consequently, by varying the air pressure on either side of the carrier 56, the carrier 56 is forced to move by such pressure through the carrier conduit 54. When the vehicle 52 is coupled, as by electromagnetism, with the carrier 56, it is forced to move with the carrier subject to the pressurization conditions within the carrier conduit 54. Pylons, pillars, and the like 58 may support the carrier conduit 54 off the ground.

Figure 2:
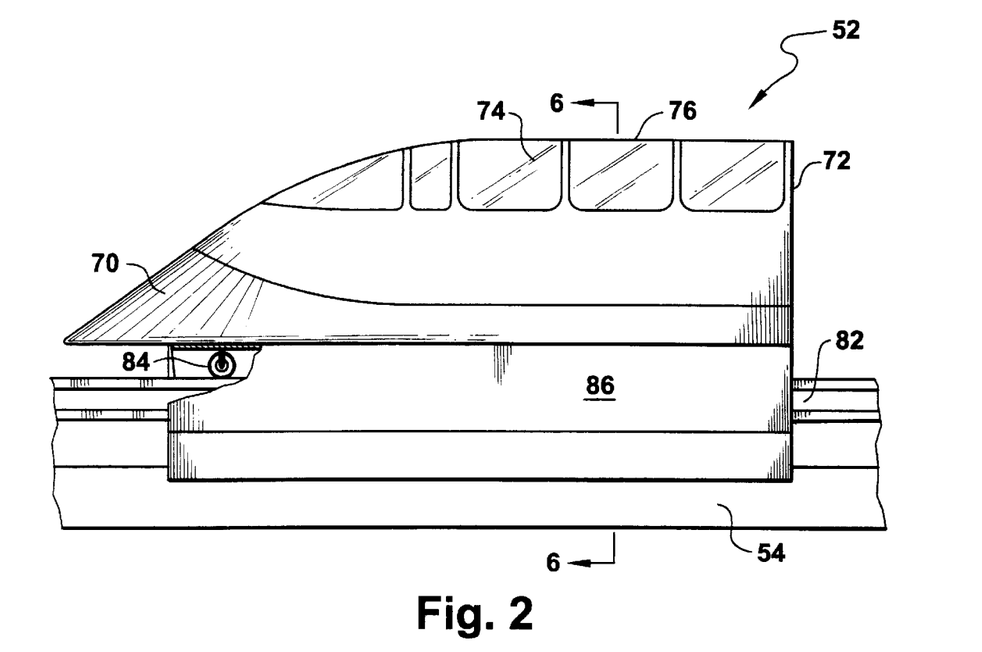
FIG. 2 is a side elevational and partial cutaway view of the vehicle and the carrier conduit of the present invention.
Figure 3:
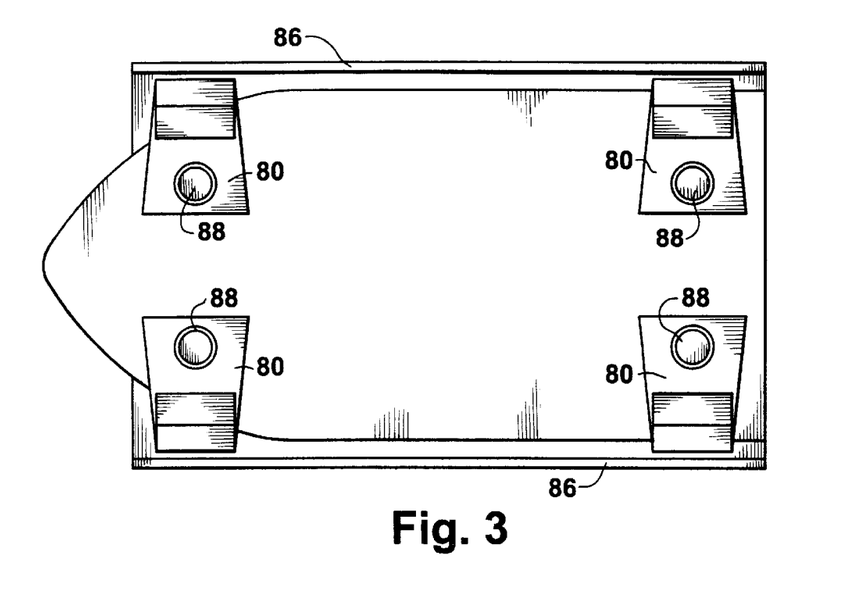
FIG. 3 is a bottom plan view of the vehicle of the present invention with the associated vanes/frames.

FIGS. 2 and 3 show views of the vehicle 52. The vehicle 52 may provide carrying space for passengers, cargo, or the like. The basic form and geometry of the vehicle 52 may be altered to accommodate the use thereof. As shown in the Figures, a passenger version of the vehicle 52 is shown that has a streamlined front end 70, a blunt rear end 72, and a large number of windows 74 to provide light and view space for the passengers. The vehicle 52 may also have streamlined front 70 and rear 72 ends. The window 74 may run along the top 76 of the vehicle 52.

Vanes, wheel mounts, or frames 80 serve to attach the vehicle 52 to the carrier conduit 54 may have a track 82 to which the vanes 80 attach. The description of the vanes 80 and the rolling wheel structure 134 housed by such vanes are set forth in more detail below. FIGS. 1–3 show a cowling, or faring, 86 that may shroud the vanes 80 and their connection with the carrier conduit 54. The cowling 86 may aid in the aerodynamic operation of the present invention.

The vehicle 52 may be spaced apart from the carrier conduit 54 by means of wheels 84 or the like. A pair of such wheels 84 may be spaced apart along the center line of the vehicle 52 as shown in FIG. 3.

Figure 4:
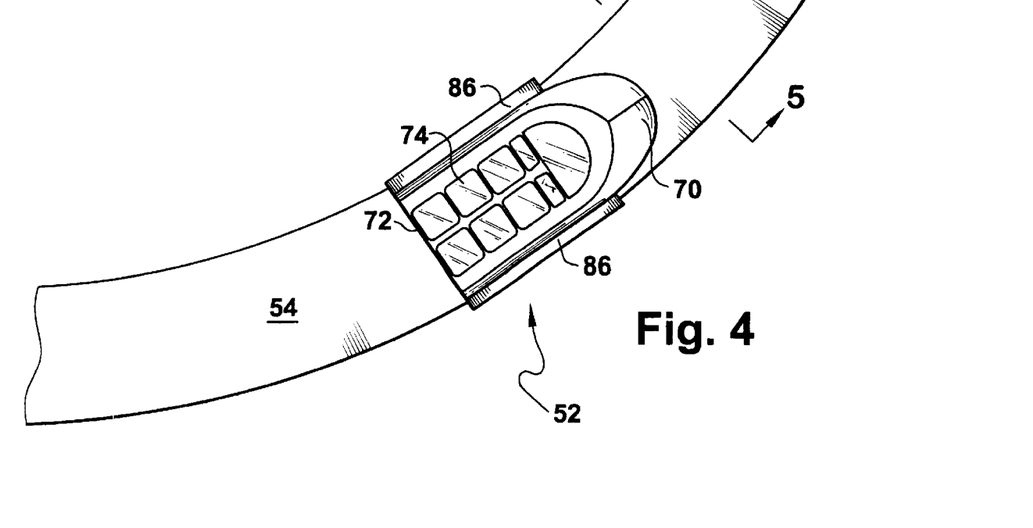
FIG. 4 is a top plan view of the vehicle and carrier conduit of the present invention.

As shown in FIG. 3, magnets 88 are coincident with pivots that allow each of the individual vanes or frames 80 to pivot with respect to the vehicle 52. As shown in FIG. 4, such pivoting action of the vanes 80 is important in order to allow the vehicle 52 to travel along a curve present in the carrier conduit 54. The magnets 88 serve to couple the vehicle 52 to the carrier 56. The carrier 56 also has magnets corresponding to the magnets 88 of the vehicle 52. The carrier magnets are opposite in polarity to those of the vehicle magnets 88 and so serve to establish electromagnetic coupling and adherence between the vehicle 52 and the carrier 56 without attaching the vehicle 52 to the carrier conduit 54. As set forth in more detail below, the vehicle 52 is slidably attached adjacent the carrier conduit 54.

Figure 5:
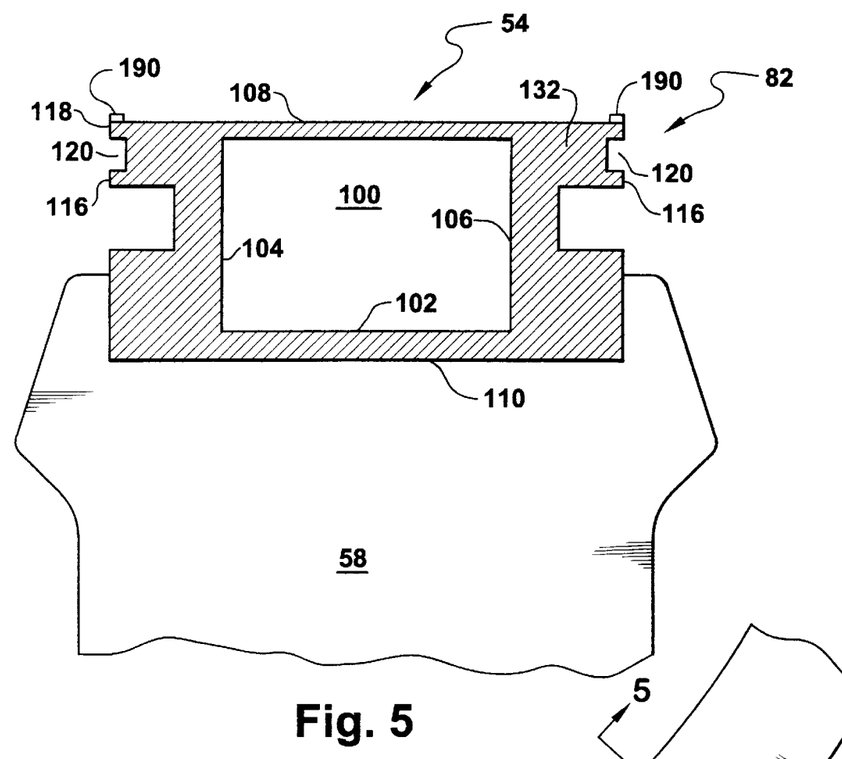
FIG. 5 is a side cross-sectional view of the carrier conduit shown in FIG. 4, taken along line 5—5.

As shown in FIG. 5, the carrier conduit 54 has a main or central chamber 100. The central chamber 100 may take on a variety of geometries and may have a cross-section of approximately fifteen (15) square feet. The bottom 102 and two (2) sides, left 104 and right 106, of the central chamber 100 may be of unitary construction forming an open and three (3) sided channel 110. The top 108 of the carrier conduit 54 may extend outwards laterally up past the left 104 and right 106 sides of the three (3) sided channel 110. The top 108 may be attached to the three (3) sided channel 110 in an airtight manner.

Access doors 112, such as those shown in FIG. 1, may be intermittently spaced apart along the sides of the three (3) sided channel 110.

In one embodiment, track blocks or the like may fit into and run along the upper outside corner of the exterior of the three (3) sided channel 110 beneath the top 108 of the carrier conduit 54. Such track blocks (not shown) could provide mechanical support for the wheel assembly system 140 present in conjunction with the vanes 80 of the vehicle 52. Preferably, the track 82 may be integrated into the carrier conduit 54. As shown in FIG. 6, an extension or projection 116 may serve to trap one (1) such wheel between itself and a top projection 118 of the top 108 of the carrier conduit 54. A recess 120 is formed therebetween and receives a wheel from the wheel assembly system 140 of the vane 80. Other alternative means may be used in order to form a recessed track through which a side wheel of the wheel assembly system 140 may rollably travel.

The three (3) sided channel 110 of the carrier conduit 54 may fit into a pylon 58 to provide secure attachment to the pylon 58 and structural integrity to the support of the carrier conduit 54. As is shown in FIG. 5, the bottom 102 of the three (3) sided channel 110 of the carrier conduit 54 is set into the pylon 58 to provide such additional support and mechanical attachment.

FIG. 6 shows the wheel assembly systems for both the vanes 80 and the carrier 56. Beginning first with the vehicle wheel assembly system 130 of the vanes 80, a set of three (3) wheels is used to trap the side extension 132 of the carrier conduit 54 between upper and lower rolling wheels 134. A side wheel 136 serves as one-half of a horizontal entrapment of the carrier conduit 54 by oppositely opposing vanes 80. The upper and lower rolling wheels 134 provide a vertical trap to prevent vertical departure of the vehicle 52 of the carrier conduit 54. The oppositely opposed left and right side wheels 136 serve to horizontally entrap the carrier conduit 54 between them, thereby preventing the vehicle 52 by the attached vanes 80 from departing horizontally from the carrier conduit 54.

When so constrained, the vehicle 52 with its vanes 80 follows the track defined by the carrier conduit track defined by the top 108 of the carrier conduit 54 and the track 82. Sets of oppositely opposing vanes 80 with the wheel assemblies 130 as described above are set forth along the vehicle 52 at propitious intervals. As shown in FIGS. 1, 3, and 4, such pairs of vanes 80 may be present at the front 70 and rear 72 of the vehicle 52.

The carrier wheel assembly 140 of the carrier 56 serves a purpose that corresponds to, but is constructed in a manner opposite to that of, the vehicle wheel assembly system 130. Whereas the vehicle wheel assembly system 130 serves to trap the portion of the carrier conduit 54 within the vehicle wheel assembly system 130, the carrier wheel assembly system 140 serves to entrap the carrier 56 within the confines of the central chamber 100 of the carrier conduit 54. In so doing, the carrier wheel assembly system 140 seeks to support the sides and edges of the carrier 56 as well as the carrier 56 itself.

In order to provide for smooth operation, the carrier 56 should not be allowed to touch or scrape the interior sides of the central chamber 100 of the carrier conduit 54. The wheel assembly system 140 of the carrier 56 serves to provide both vertical and horizontal support in positioning for the carrier 56. As shown in FIGS. 6, 8, and 9, the carrier 56 has a pair of top rollers 142, a pair of side rollers 144 and a pair of bottom rollers 146. The rollers 142, 144, 146 are distributed across a framework 148 that may be present at opposite ends of the carrier 56. The rollers 142, 144, 146 serve to support the carrier 56 so that it may easily slide or roll through the central chamber 100 of the carrier conduit 54.

FIG. 7 shows an individual wheel assembly 160 as contemplated for use in the present invention. The wheel assembly 160 may be the same as that used for the wheels of the frame 80 and the carrier 56. As shown in FIG. 7, the individual wheel assembly 160 has a wheel 134 (the same as that for the rolling wheels 134 as shown in FIG. 6). The rolling wheel 134 may be centrally supported on either end by an axle 162. Springs and/or shock absorbers 164 may serve to intermediate the support of the axle 162 with the support of a base 166. The springs and/or shock absorbers 164 serve to bias the rolling wheel 134 away from the base 166. The springs and/or shock absorbers 164 may also serve to provide a minimum clearance between the base 166 and the rolling wheel 134 to ensure that the rolling wheel 134 never comes into contact with the base 166.

By appropriately allocating the bias of the rolling wheel 134 by the springs and/or shock absorbers 164, the width of the lateral side extensions 132 of the carrier conduit 54 can be entrapped between upper and lower wheel assemblies 160. The same is likewise true for the wheels present on the carrier 56. Appropriate spring tension and/or shock absorber extension serves as a means by which the accompanying foundation or frame 166 is held away from the carrier conduit 54, and the carrier 56 slides or rolls within the carrier conduit 54.

FIGS. 8 and 9 show the carrier 56 and wheel assemblies. Additionally, strong carrier magnets 170 are shown as being present in pairs at the top of the carrier 56 on the roller framework 148. The magnets 170 may be permanent magnets or electromagnets according to different embodiments of the present invention.

The carrier 56 has a pair of opposing plates 172 which generally fill the corresponding central chamber 100 of the carrier conduit 54. The plates 172 generally conform to the interior of the central chamber 100 in order to block the flow of air from high pressure areas witin the carrier conduit 54 to areas of lower pressure. In this way, forces are applied to the plates 172 that move them according to the pressurization inside the central chamber 100. As the carrier magnets 170 couple the carrier 56 to the vehicle 52 via the vehicle magnets 88, motion of the carrier 56 causes the vehicle 52 to move as well.

A beam or other support 174 may intermediate the distance between the plates 172 and serve to space such plates 172 apart a distance appropriate for an associated vehicle 52.

Having described the general structure of the transportation system 50 of the present invention, it is to be understood that the geometries present in the transportation system 50 may be subject to alternative embodiments within the scope of the present invention. For example, the central chamber 100 may be circular, and not rectangular, in nature.

Composite materials or the like may be used to construct the carrier conduit 54. Aluminum or the like may be used to construct the vehicle 52 as well as the vanes 80. Aluminum may also be used to construct the carrier 56. By using such lightweight materials for the vehicle 52 and the carrier 56, force applied in the form of air pressure to the carrier 56 may be better used in order to transport the persons or cargo present in the vehicle 52 rather than the vehicle 52 or the carrier 56 themselves. The wheels used to provide sliding attachment between the carrier conduit 54 and either the vehicle 52 and/or the carrier 56 should add as little friction as possible to the system so that rolling is achieved much more easily with lower pressures being used to initially move the vehicle 52 and less pressure is needed to accelerate and maintain the velocity of the vehicle 52.

Pressurized air is used to press against the plates 172 of the carrier 56. In applying higher air pressure on one side of the carrier 56, the carrier 56 is caused to move away from such higher pressure. The carrier magnets 170 are coupled to the vehicle magnets 88 and cause the vehicle 52 to move with the carrier 56. Sources of compressed air or pressurized air may be present at either end of the carrier conduit 54 in order to control the motion of the vehicle 52. Sensors may be present throughout the carrier conduit 54 to monitor pressures therein. Sensors may also be used to monitor the travel and velocity of the vehicle 52. Normal braking means may be used to serve to stop the vehicle 52. However, controlled pressure schemes may also be used to adjust the pressures within the carrier conduit 54, causing the vehicle 52 to stop.

Beyond the supplying of pressurized air in order to control motion of the vehicle 52, a lowering of the air pressure can serve to enhance the presence of high air pressure on the opposite side of the carrier 56. In such a circumstance, the source of air at lower pressure may serve to "pull" the carrier 56 through the carrier conduit 54 in conjunction with the "push" of the high air pressure. Spaced relief valves (not shown) may be used throughout the interior of the carrier conduit 54 in order to controllably release any pressure therein. By applying the brakes to the vehicle 52 (such as by reversing air pressure or by applying mechanical brakes) and by releasing or repelling or causing the vehicle and carrier magnets 88, 170 to repel one another, the carrier 56 may be decoupled from the vehicle 52, allowing the vehicle 52 to remain stationary on the track. A series or variety of carriers may then be used and shuffled underneath individual vehicles in order to provide more options and with respect to the operation of the transportation system 50 of the present invention.

Electrical power for use in supplying energization to electromagnets, lighting, and the like for either or both of the vehicle 52 and the carrier 56 may be present in the form of supply strips 190 (FIG. 5) or the like, serving to supply power to the vehicle 52 and/or the carrier 56.

Calculations show that for a ten-thousand pound (10,000 lb.) gross weight of the vehicle 52, the pressure necessary for a fifteen (15) foot square plate 172 is approximately 15.5 psi. Additionally, a force on the order of approximately 15.4 psi may be required to provide a force of approximately 1,395 pounds in order to bring the vehicle 52 and the carrier 56 to a speed of approximately sixty (60) miles per hour in approximately twenty (20) seconds. For a carrier plate 172 of approximately fifteen (15) square feet, the cubic air flow of approximately 1,250 cubic feet per second is required to provide a sufficient volume of air for the sixty (60) mile per hour of the carrier 56, the vehicle 52, any people or any cargo carried inside the vehicle 52.

In additional embodiments, acoustical pressure waves within the carrier conduit 54 may possibly be used in order to provide propulsion for the present system. Additionally, distributed pressurization systems might be used in conjunction with the present invention, either substituting for complimenting pressurization systems at either end of the carrier conduit 54. Additionally, air volume removing systems may be used in order to remove the air from in front of the carrier 56 as it travels through the carrier conduit 54 in order to provide greater use of operation and better performance.

Figure 10:
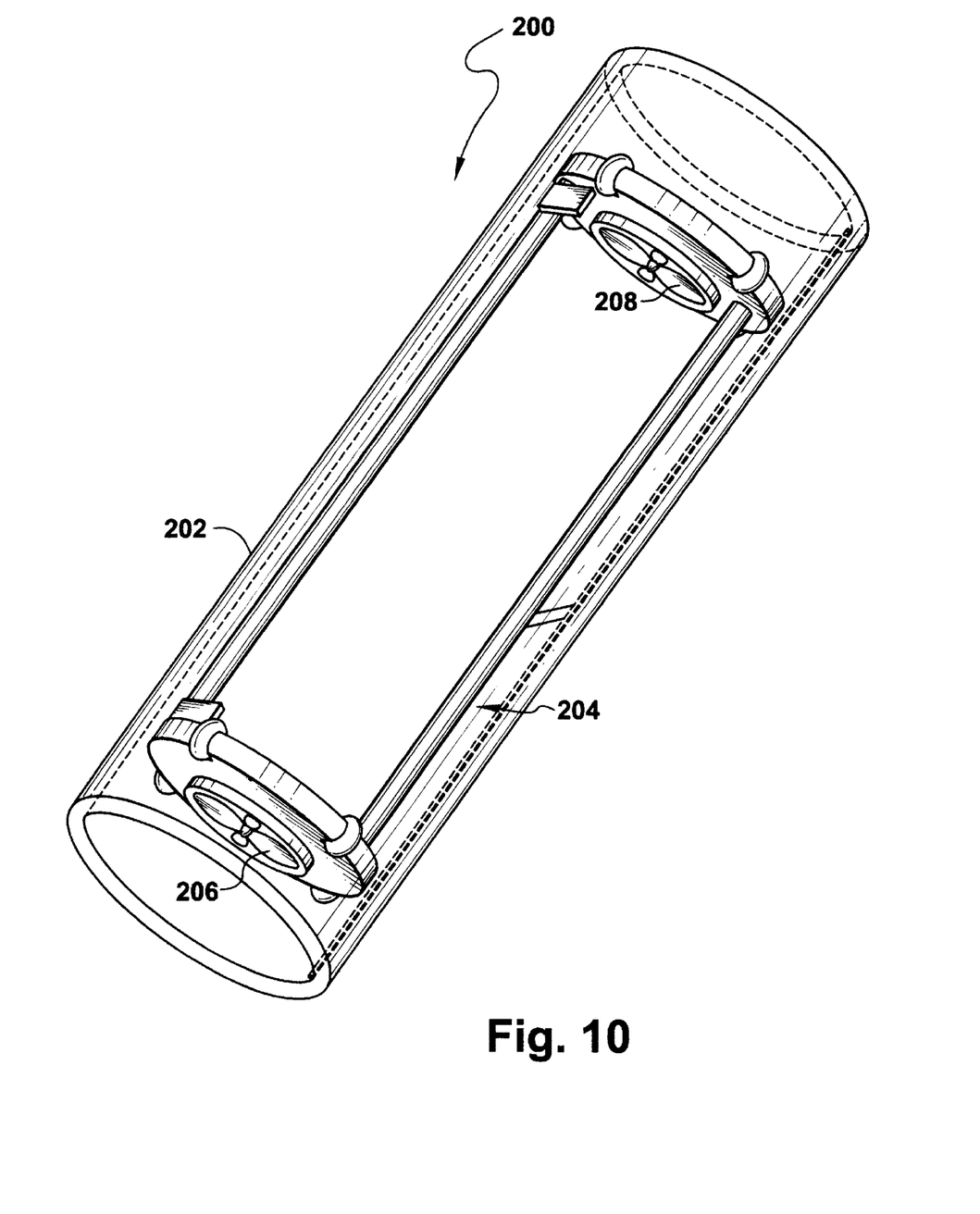
FIG. 10 is a side perspective and partial cutaway view of a cylindrical carrier conduit with a cylindrical carrier shown inside.
Figure 13:
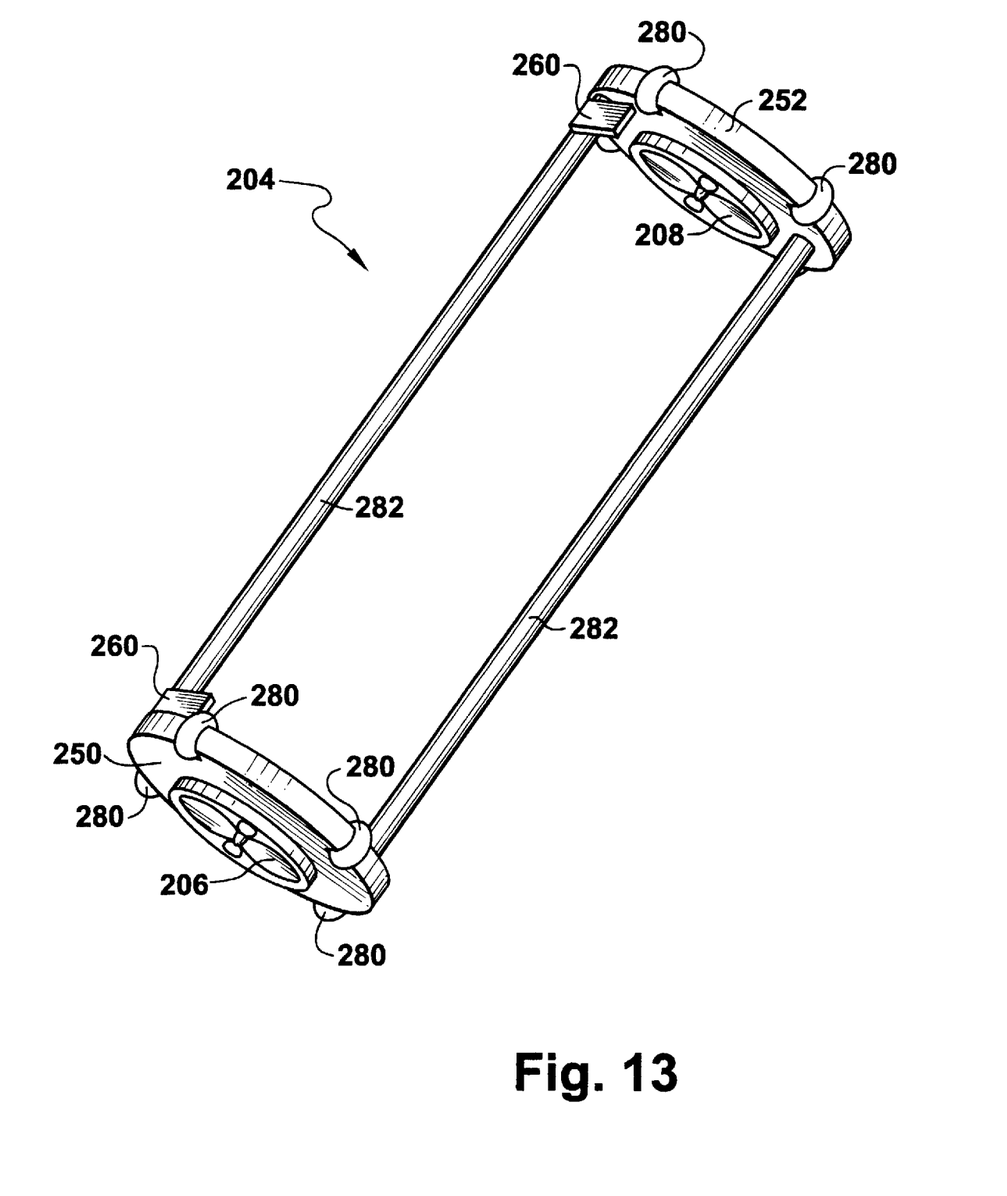
FIG. 13 is a side perspective view of the cylindrical carrier shown in FIG. 10.

An alternative embodiment of the present invention is shown in FIGS. 10–13. In FIG. 10, a cylindrical carrier conduit configuration 200 uses a cylindrical carrier conduit 202 and forms a passageway through which a cylindrical carrier 204 may travel. As shown in FIGS. 10 and 13, the cylindrical carrier 204 may provide its own pressure through the use of air pressurizers such as oppositely opposing fans 206, 208.

More regarding the construction of the cylindrical carrier 204 is set forth in the description of FIG. 13, below. The cylindrical carrier 204 operates in generally the same manner as the more rectangular carrier shown in FIGS. 6, 8, and 9. The magnets used on the cylindrical carrier 204 keep it aligned and generally free from rotation as they are magnetically attracted to corresponding magnets on the underside of the transported vehicle or car.

Figures 11, 12:
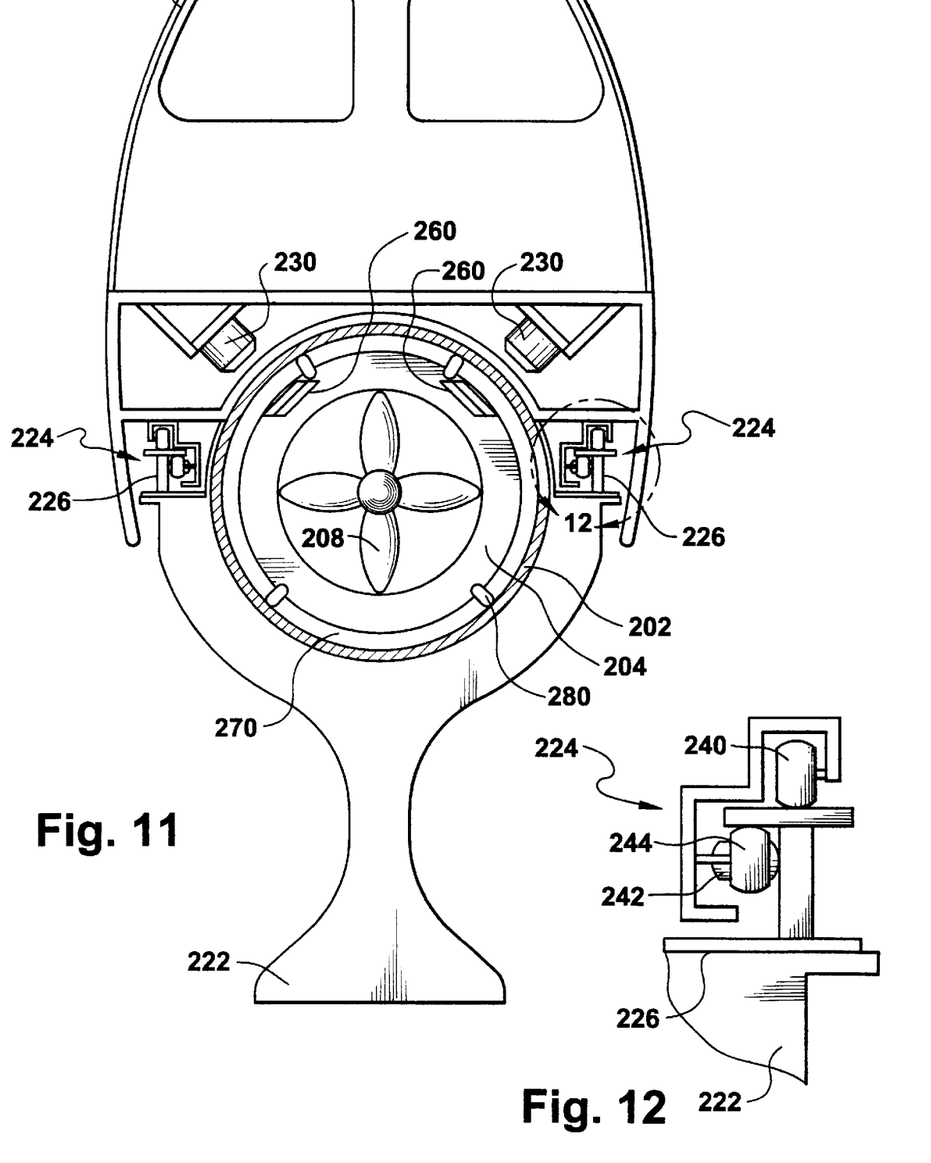
FIG. 11 is a cross-sectional view of the present invention using a cylindrical carrier conduit configuration.
FIG. 12 is a front elevational view of the wheel assembly system shown in circle 12 of FIG. 11.

In FIG. 11, the vehicle 220 is designed to accommodate the cylindrical carrier conduit 202. The cylindrical carrier conduit 202 is supported by a pylon or pillar 222. The vehicle 220 is held above the cylindrical carrier conduit 202 by wheel supports 224 (shown in FIG. 12). The flanged rails or the like 226 constructively engage the wheeled supports 224 in order to hold the vehicle 220 on the pillar 222 and about the cylindrical carrier conduit 202.

As in the embodiment shown in FIG. 6, strong electromagnets 230 couple the vehicle 220 to the cylindrical carrier 204. As the fans 206, 208 of the carrier 204 force air past them, the air provides an equal and opposite force against the fans and the carrier in order to propel the carrier 204 through the cylindrical carrier conduit 202. The vehicle 220 is coupled to the carrier 204 via the magnets 230 and moves with the cylindrical carrier 204.

FIG. 12 shows a wheeled support 224 and a flanged rail 226. In the wheeled support 224 shown in FIG. 12, there is an upper supporting wheel 240 and a side engaging wheel 242. A lower entrapping wheel 244 serves to constrain the vertical movement of the wheeled support 224 in conjunction with the upper supporting wheel 240. In conjunction with its mate on the other side of the cylindrical conduit 202, the side engaging wheel 242 serves to restrain the horizontal motion of the vehicle 220.

Through the constructive and captive engagement of the flanged rails 226 by the wheeled supports 224, the vehicle 200 is held in place on the pillar pylon 222 while allowing sliding or rolling movement along the flanged rails 226 adjacent the cylindrical carrier conduit 204.

FIG. 13 shows the cylindrical carrier 204 of FIGS. 10 and 11. The cylindrical carrier 204 forms the propulsion means by which the vehicle 220 is carried along the pillar pylon 222 and its attached flanged rails 226.

The cylindrical carrier 204 may generally be configured as two spaced-apart fans 206, 208, and their associated holders or chassis 250, 252. The fans 206, 208 provide the motivating air pressure allowing the cylindrical carrier 204 to travel through the carrier conduit 202. Magnets 260 are set upon the cylindrical carrier 204 in order to best engage in a magnetic fashion the electromagnets 230 of the vehicle 220. As with the fans 206, 208, the magnets 260 may be powered via a power strip or the like running through the interior of the cylindrical carrier conduit 202.

In function, the cylindrical carrier conduit configuration 200 of FIGS. 10–13 operates in the manner similar to that shown in the other drawings and as otherwise described herein. The addition of the fans 206, 208 to the carrier 204 provides local control over the motion and travel of the vehicle 220. Operator controls can be incorporated into the vehicle 220 such that they operate the speed of the fans 206, 208 and the pressures they create. Such operator controls may also include the strength of the magnetic fields generated by the electromagnets 230 and the magnets 260.

The fan chassis 250, 252 may be made of material suitable for the cylindrical carrier 204, preferably one that is non-conducting and non-susceptible to electromagnetic fields. The chassis 250, 252 obstruct the flow of air through them, and the gap 270 (FIG. 11) between the exterior of the chassis 250, 252 and the inner surface of the cylindrical conduit 202 should be as small as possible while allowing for a rapid rate of velocity, acceleration, and deceleration of the carrier 204. The wheels 280 on the carrier 204 should be low friction, low clearance wheels that provide suitable low friction rolling when they contact the interior of the cylindrical conduit 202.

Bars, rods, supports or the like 282 separate the two chassis 250, 252 in a rigid and fixed manner. This provides support for the chassis 250, 252 and enables the cylindrical carrier 204 to travel through the cylindrical conduit 202 without brushing against the interior sides of the conduit 202. In order to provide additional pressure and air movement, additional air chassis with fans may be fixed upon the supporting bars 282. Additional magnets may also be fixed thereto.

While the present invention has been described with regards to particular embodiments, it is recognized that additional variations of the present invention may be devised without departing from the inventive concept.

What is claimed is:

1. A transportation system, comprising:

a carrier conduit, said carrier conduit defining a generally fluidtight enclosed channel;

a carrier, said carrier travelling through said carrier conduit channel said carrier motivated to travel through said carrier conduit by difference of pressure on a first side of said carrier with respect to a second side of said carrier, said carrier having a first upper pair of wheels biasedly engaging a top interior side of said carrier conduit channel, said carrier having a second lower pair of wheels biasedly engaging a bottom interior side of said carrier conduit channel, and said carrier having first and second side wheels biasedly engaging first and second side interior sides of said pressurization channel so that said carrier is held and disposed away from said interior sides of said carrier conduit channel; and a vehicle, said vehicle being positioned exteriorly of said carrier conduit and coupled to said carrier and travelling with said carrier as said carrier travels through said carrier conduit channel; whereby said vehicle travels along said carrier conduit to transport persons or cargo from one point of said carrier conduit to another.

2. The transportation system of claim 1, wherein said carrier conduit further comprises:

a track, said track coupling said vehicle to said carrier conduit.

3. The transportation system of claim 2, wherein said carrier conduit further comprises:

composite materials generally nonreactive to the presence of magnetic fields; whereby magnetic fields may pass freely through said carrier conduit.

4. The transportation system of claim 1, wherein said carrier further comprises:

a first plate, said first plate providing a generally planar surface facing outward from said carrier against which air or other fluid pressure may be brought to bear, said first plate approximating a perpendicular cross section of said carrier conduit channel; and a first carrier wheel assembly system coupled to said first plate, said first carrier wheel assembly system rollably engaging an interior of said carrier conduit channel and preventing contact between edges of said first plate from contacting said interior; whereby said first plate resists fluid flow within said carrier conduit channel past said first plate, said carrier urged to move by resistance of said first plate to said fluid flow, said first plate avoiding contact with said interior particularly when said carrier moves through said carrier conduit.

5. The transportation system of claim 4, wherein said carrier further comprises:

a second plate, said second plate oppositely opposed said first plate, said first and second plates being separated by a fixed distance and both providing generally planar surfaces facing outward from said carrier against which air or other fluid pressure may be exerted, said first and second plates both approximating perpendicular cross sections of said carrier conduit channel; and a second carrier wheel assembly system coupled to said second plate, said second carrier wheel assembly system rollably engaging said interior of said carrier conduit channel and preventing contact between edges of said second plate from contacting said interior; whereby said first plate resists fluid flow in a first direction and said second plate resists fluid flow in a second direction, said carrier being urged to move by resistance of said first and second plates to said fluid flow, said first and second plates avoiding contact with said interior particularly when said carrier moves through said carrier conduit.

6. The transportation system of claim 4, wherein said carrier further comprises:

a magnet, said magnet coupled to said first plate and having a magnetic field, said magnet disposed to direct said magnetic field toward said vehicle; whereby said carrier may be magnetically coupled to said vehicle.

7. The transportation system of claim 6, wherein said magnet is selected from the group consisting of permanent magnets and electromagnets.

8. The transportation system of claim 1, wherein said carrier further comprises:

a first chassis;

a first fan, said first fan coupled to said first chassis; and a first carrier wheel assembly system coupled to said first chassis, said first carrier wheel assembly system rollably engaging an interior of said carrier conduit and preventing contact between edges of said first chassis from contacting said interior; whereby said first fan provides air pressure and urges said carrier to move along said carrier conduit.

9. The transportation system of claim 8, wherein said carrier further comprises:

a second chassis, said second chassis oppositely opposed said first chassis, said first and second chassis separated by a fixed distance, said first and second chassis approximating perpendicular cross sections of said carrier conduit;

a second fan, said second fan coupled to said second chassis; and a second carrier wheel assembly system coupled to said second chassis, said second carrier wheel assembly system rollably engaging said interior of said carrier conduit and preventing contact between edges of said second chassis from contacting said interior; whereby said second fan provides air pressure and urges said carrier to move along said carrier conduit.

10. The transportation system of claim 1, wherein said vehicle further comprises:

an enclosed section, said enclosed section protecting persons or cargo from ambient elements; and wheels attached to said enclosed section, said wheels supporting said enclosed section and allowing said enclosed section to roll over said carrier conduit.

11. The transportation system of claim 10, wherein said vehicle further comprises:

vanes, said vanes pivotably coupling said vehicle to said carrier conduit; whereby said vanes ensure attachment of said vehicle to said carrier conduit during travel of said vehicle along said carrier conduit.

12. The transportation system of claim 11, wherein each of said vanes further comprises:

a vehicle wheel assembly coupled to said vane, said vehicle wheel assembly engaging said carrier conduit.

13. The transportation system of claim 12, further comprising:
first and second oppositely opposed vanes with correspondingly associated first and second vehicle wheel assemblies entrapping a top portion of said carrier conduit to securely couple said vehicle to said carrier conduit.

14. The transportation system of claim 1, wherein said vehicle further comprises:
a magnet, said magnet coupled to a bottom of said vehicle and having a magnetic field, said magnet disposed to direct said magnetic field toward said carrier; whereby said vehicle may be magnetically coupled to said carrier.

15. The transportation system of claim 14, wherein said magnet is selected from the group consisting of permanent magnets and electromagnets.

16. A transportation system, comprising:
a carrier conduit, said carrier conduit defining a generally fluidtight enclosed channel, said carrier conduit constructed of composite materials generally nonreactive to the presence of magnetic fields so that magnetic fields may pass freely through said carrier conduit;
a track, said track coupling said vehicle to said carrier conduit;
a carrier, said carrier travelling through said carrier conduit channel, said carrier motivated to travel through said carrier conduit by difference of pressure on a first side of said carrier with respect to a second side of said carrier;
a first plate, said first plate coupled to said carrier and providing a generally planar surface facing outward from said carrier against which air or other fluid pressure may be brought to bear, said first plate approximating a perpendicular cross section of said carrier conduit channel;
a first carner wheel assembly system coupled to said first plate, said first carrier wheel assembly system rollably engaging an interior of said carrier conduit channel and preventing contact between edges of said first plate from contacting said interior so that said first plate resists fluid flow within said carrier conduit channel past said first plate, said carrier urged to move by resistance of said first plate to said fluid flow, said first plate avoiding contact with said interior particularly when said carrier moves through said carrier conduit;
a second plate, said second plate coupled to said carrier and oppositely opposed said first plate, said first and second plates being separated by a fixed distance and both providing generally planar surfaces facing outward from said carrier against which air or other fluid pressure may be exerted, said first and second plates both approximating perpendicular cross sections of said carrier conduit channel;
a second carrier wheel assembly system coupled to said second plate, said second carrier wheel assembly system rollably engaging said interior of said carrier conduit channel and preventing contact between edges of said second plate from contacting said interior so that said first plate resists fluid flow in a first direction and said second plate resists fluid flow in a second direction, said carrier being urged to move by resistance of said first and second plates to said fluid flow, said first and second plates avoiding contact with said interior particularly when said carrier moves through said carrier conduit;

said first and second carrier wheel assemblies each having a first upper pair of wheels biasedly engaging a top interior side of said carrier conduit channel a second lower pair of wheels biasedly engaging a bottom interior side of said carrier conduit channel and first and second side wheels biasedly engaging first and second side interior sides of said pressurization channel so that each of said first and second plates correspondingly associated with said first and second wheel assemblies are held and disposed by said first and second wheel assemblies away from said interior sides of said carrier conduit channel; and a vehicle, said vehicle being positioned exteriorly of said carrier conduit and coupled to said carrier and travelling with said carrier as said carrier travels through said carrier conduit channel; whereby said vehicle travels along said carrier conduit to transport persons or cargo from one point of said carrier conduit to another.

17. The transportation system of claim 16, wherein said carrier further comprises:
a beam, said beam coupled to said first and second plates and separating said first and second plates by said fixed distance.

18. A transportation system, comprising:
a carrier conduit, said carrier conduit defining a generally fluidtight enclosed channel;
a carrier, said carrier travelling through said carrier conduit channel, said carrier motivated to travel through said carrier conduit by difference of pressure on a first side of said carrier with respect to a second side of said carrier; and
a vehicle, said vehicle being positioned exteriorly of said carrier conduit and coupled to said carrier and travelling with said carrier as said carrier travels through said carrier conduit channel, said vehicle having an enclosed section, said enclosed section protecting persons or cargo from ambient elements, said enclosed section having wheels attached thereto, said wheels supporting said enclosed section and allowing said enclosed section to roll over said carrier conduit, said vehicle having vanes, said vanes pivotably coupling said vehicle to said carrier conduit so that said vanes ensure attachment of said vehicle to said carrier conduit during travel of said vehicle along said carrier conduit;
first and second oppositely opposed vanes with correspondingly associated first and second vehicle wheel assemblies entrapping a top portion of said carrier conduit to securely couple said vehicle to said carrier conduit, each vehicle wheel assembly having a biased top wheel coupled to said vane, said biased top wheel supporting said vane and restricting downward travel of said vane toward said carrier conduit, a biased side wheel coupled to said vane, said biased side wheel restricting travel of said vane laterally towards said carrier conduit, and a biased bottom wheel coupled to said vane, said biased bottom restricting upward travel of said vane so that a top lateral projection of said carrier conduit is engaged on three sides by said vehicle wheel assembly; whereby said vehicle travels along said carrier conduit to transport persons or cargo from one point of said carrier conduit to another.

19. A transportation system, comprising:

a carrier conduit;

a carrier;

a vehicle;

said carrier conduit defining a generally fluidtight enclosed channel, said carrier conduit having a top supporting surface and first and second oppositely opposed side tracks, said carrier conduit constructed of composite materials generally nonreactive to presence of magnetic fields so that magnetic fields may pass as freely as possible through said carrier conduit;

said carrier travelling through said carrier conduit channel, said carrier motivated to travel through said carrier conduit by difference of pressure on a first side of said carrier with respect to a second side of said carrier, said carrier having first and second oppositely opposed plates separated by a fixed distance by an attached beam, said beam coupled to said first and second plates and separating said first and second plates by said fixed distance, said first and second plates providing generally flat or smooth surfaces facing outward from said carrier against which air or other fluid pressure may be brought to bear, said first and second plates approximating perpendicular cross sections of said carrier conduit channel, said carrier having first and second carrier wheel assembly systems corresponding to said first and second plates, said first and second carrier wheel assembly systems rollably engaging interior sides of said carrier conduit channel and preventing contact between edges of said first and second plates from contacting said interior sides so that said first and second plates may provide greater resistance to fluid flow within said carrier conduit channel without coming into contact with said interior sides particularly when said carrier moves through said carrier conduit, said first and second wheel assembly systems each having a first upper pair of wheels biasedly engaging a top interior side of said carrier conduit channel, a second lower pair of wheels biasedly engaging a bottom interior side of said carrier conduit channel, and first and second side wheels biasedly engaging first and second side interior sides of said pressurization channel so that each of said first and second plates correspondingly associated with said first and second carrier wheel assemblies are held and disposed by said first and second carrier wheel assemblies away from said interior sides of said carrier conduit channel, said carrier having a carrier magnet coupled to said first plate and having a magnetic field directed generally toward said vehicle so that said carrier may be magnetically coupled to said vehicle, said carrier magnet selected from the group consisting of permanent magnets and electromagnets;

said vehicle coupled to said carrier and travelling with said carrier as said carrier travels through said carrier conduit channel, said vehicle travelling upon said top supporting surface of said carrier conduit, said first and second tracks coupling said vehicle to said carrier conduit, said vehicle having an enclosed section, said enclosed section protecting persons or cargo from ambient elements, said vehicle having central wheels attached to said enclosed section, said central wheels supporting said enclosed section and allowing said enclosed section to roll upon said top supporting surface of said carrier conduit, said vehicle having vanes pivotably coupling said vehicle to said carrier conduit so that said vanes ensure attachment of said vehicle to said carrier conduit during travel of said vehicle along said carrier conduit, each of said vanes having a separate vehicle wheel assembly coupled to said vane, said vehicle wheel assembly engaging one of said side tracks of said carrier conduit, first and second oppositely opposed vanes with correspondingly associated first and second vehicle wheel assemblies entrapping a top portion of said carrier conduit by alignedly engaging said first and second carrier conduit side tracks to securely couple said vehicle to said carrier conduit, each of said vehicle wheel assemblies having a biased top wheel coupled to said vane, said biased top wheel supporting said vane and restricting downward travel of said vane toward said carrier conduit, and having a biased side wheel coupled to said vane, said biased side wheel restricting travel of said vane laterally towards said carrier conduit, and having a biased bottom wheel coupled to said vane, said biased bottom restricting upward travel of said vane so that each of said vehicle wheel assemblies engage one of said side tracks of said carrier conduit on three sides, said vehicle having a vehicle magnet coupled to a bottom of said vehicle and having a magnetic field, said magnet disposed to direct said magnetic field toward said carrier and said carrier magnet, a polarity of said vehicle magnet directed toward said carrier opposite to that of a polarity of said carrier magnet directed toward said vehicle so that said vehicle may be magnetically coupled to said carrier, said vehicle magnet selected from the group consisting of permanent magnets and electromagnets; whereby said vehicle travels along said top supporting surface of said carrier conduit to transport persons or cargo from one point of said carrier conduit to another.

20. A transportation system, comprising:

a carrier conduit, said carrier conduit defining a generally cylindrical and fluidtight enclosed channel, said carrier conduit constructed of composite materials generally nonreactive to presence of magnetic fields so that magnetic fields may pass freely through said carrier conduit;

a carrier, said carrier having first and second sides and travelling through said carrier conduit channel, said carrier motivated to travel through said carrier conduit by difference of pressure on said first side of said carrier with respect to said second side of said carrier, said carrier having first and second oppositely opposed chassis separated by a fixed distance by an attached beam, said beam coupled to said first and second chassis and separating said first and second chassis by said fixed distance;

a vehicle, said vehicle being positioned exteriorly of said carrier conduit and being operatively coupled to said carrier and travelling with said carrier as said carrier travels through said carrier conduit channel, said vehicle travelling over a top surface of said carrier conduit, said vehicle having an enclosed section, said enclosed section protecting persons or cargo from ambient elements;

first and second air pressurizers, said first air pressurizer coupled to said first chassis and said second air pressurizer coupled to said second chassis, said first and second air pressurizers providing air pressure to urge said carrier to move along said carrier conduit;

first and second wheel assembly systems, said first wheel assembly system coupled to said first chassis and said second wheel assembly system coupled to said second chassis, said first and second wheel assembly systems rollably engaging an interior of said carrier conduit and preventing contact between edges of said first and second chassis from contacting said interior a carrier magnet, said carrier magnet coupled to said carrier and having a magnetic field directed generally toward said vehicle so that said carrier may be magnetically coupled to said vehicle, said carrier magnet selected from the group consisting of permanent magnets and electromagnets;

first and second oppositely opposed side tracks adjacent said carrier conduit, said first and second tracks coupling said vehicle to said carrier conduit;

vehicle wheels coupled to said vehicle, said vehicle wheels engaging said first and second side tracks to support said vehicle and to couple said vehicle to said tracks;

a vehicle magnet coupled to a bottom of said vehicle and having a magnetic field, said magnet disposed to direct said magnetic field toward said carrier and said carrier magnet, a polarity of said vehicle magnet directed toward said carrier opposite to that of a polarity of said carrier magnet directed toward said vehicle so that said vehicle may be magnetically coupled to said carrier, said vehicle magnet selected from the group consisting of permanent magnets and electromagnets; whereby said vehicle travels along said top surface of said carrier conduit to transport persons or cargo from one point of said carrier conduit to another.

21. A transportation system, comprising:

a carrier conduit, said carrier conduit defining a generally fluidtight enclosed channel and having a top lateral projection;

a carrier, said carrier travelling through said carrier conduit channel, said carrier motivated to travel through said carrier conduit by difference of pressure on a first side of said carrier with respect to a second side of said carrier; and a vehicle, said vehicle being positioned exteriorly of said carrier conduit and coupled to said carrier and travelling with said carrier as said carrier travels through said carrier conduit channel, said vehicle having a vane;

a biased top wheel, said biased top wheel coupled to said vane, said biased top wheel supporting said vane and restricting downward travel of said vane toward said carrier conduit;

a biased side wheel, said biased side wheel coupled to said vane, said biased side wheel restricting travel of said vane laterally towards said carrier conduit; and a biased bottom wheel, said biased bottom wheel coupled to said vane, said biased bottom restricting upward travel of said vane;

said top lateral projection of said carrier conduit is engaged on three respective sides by said biased top wheel, by said biased side wheel, and by said biased bottom wheel; whereby said vehicle travels along said carrier conduit to transport persons or cargo from one point of said carrier conduit to another.

* * * * *